(12) United States Patent
Adema

(10) Patent No.: US 12,282,153 B2
(45) Date of Patent: Apr. 22, 2025

(54) MEMS MIRROR IN SERIES WITH RESONANT MEMS MIRROR TO REDISTRIBUTE DENSE PIXELS

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 611 days.

(21) Appl. No.: 17/578,027

(22) Filed: Jan. 18, 2022

(65) Prior Publication Data

US 2023/0228985 A1      Jul. 20, 2023

(51) Int. Cl.
*G02B 26/08* (2006.01)
*G02B 26/10* (2006.01)
*G02B 27/01* (2006.01)

(52) U.S. Cl.
CPC ....... *G02B 26/0833* (2013.01); *G02B 26/101* (2013.01); *G02B 27/0172* (2013.01); *G02B 27/0176* (2013.01); *G02B 2027/0154* (2013.01); *G02B 2027/0178* (2013.01)

(58) Field of Classification Search
CPC .............. G02B 26/00; G02B 26/0825; G02B 26/0833; G02B 26/10; G02B 26/101; G02B 26/103; G02B 27/01; G02B 27/017; G02B 27/0172; G02B 27/0176; G02B 27/0178; G02B 2027/0154; G02B 2027/0178
See application file for complete search history.

(56) References Cited

U.S. PATENT DOCUMENTS

| 2009/0141192 | A1* | 6/2009 | Nojima | ................. | H04N 9/3147 |
| | | | | | 348/E3.048 |
| 2011/0211241 | A1* | 9/2011 | Ide | ...................... | G02B 26/0858 |
| | | | | | 359/198.1 |
| 2014/0240378 | A1* | 8/2014 | Fujioka | ..................... | G09G 5/10 |
| | | | | | 345/690 |
| 2015/0015929 | A1 | 1/2015 | Wilhelm et al. | | |
| 2017/0235058 | A1 | 8/2017 | Zhang et al. | | |
| 2018/0056590 | A1 | 3/2018 | Costabeber | | |
| 2019/0204912 | A1* | 7/2019 | Yang | ....................... | G06F 3/013 |
| 2019/0302447 | A1* | 10/2019 | Yamada | ............. | G02B 26/0858 |
| 2020/0132981 | A1* | 4/2020 | Van Lierop | ........... | G01S 7/4865 |

(Continued)

FOREIGN PATENT DOCUMENTS

DE       102017103635 A1    8/2018
WO         2018057373 A1    3/2018
(Continued)

OTHER PUBLICATIONS

International Search Report and Written Opinion mailed Mar. 13, 2023 for PCT/US2022/048377, 20 pages.
(Continued)

*Primary Examiner* — Sultan Chowdhury

(57) ABSTRACT

A near-eye display system employs a low-amplitude, low-frequency micro-electromechanical system (MEMS) mirror in series with a higher-amplitude, higher-frequency resonant MEMS mirror to rotate at a reduced amplitude and frequency with respect to the resonant MEMS mirror redistribute illumination pulses or pixels at the extents of a sinusoidal angular scan pattern of the resonant MEMS mirror.

17 Claims, 11 Drawing Sheets

(56) References Cited

U.S. PATENT DOCUMENTS

| | | | |
|---|---|---|---|
| 2021/0055565 A1* | 2/2021 | Moore | G02C 11/10 |
| 2021/0223537 A1* | 7/2021 | Melville | G02B 26/0833 |
| 2021/0278587 A1* | 9/2021 | Schowengerdt | G02B 27/0172 |

FOREIGN PATENT DOCUMENTS

| | | |
|---|---|---|
| WO | 2018175265 A1 | 9/2018 |
| WO | 2020205314 A1 | 10/2020 |
| WO | 2021071616 A1 | 4/2021 |

OTHER PUBLICATIONS

International Preliminary Report on Patentability mailed Aug. 2, 2024 for PCT Application No. PCT/US2022/048377, 10 pages.

\* cited by examiner

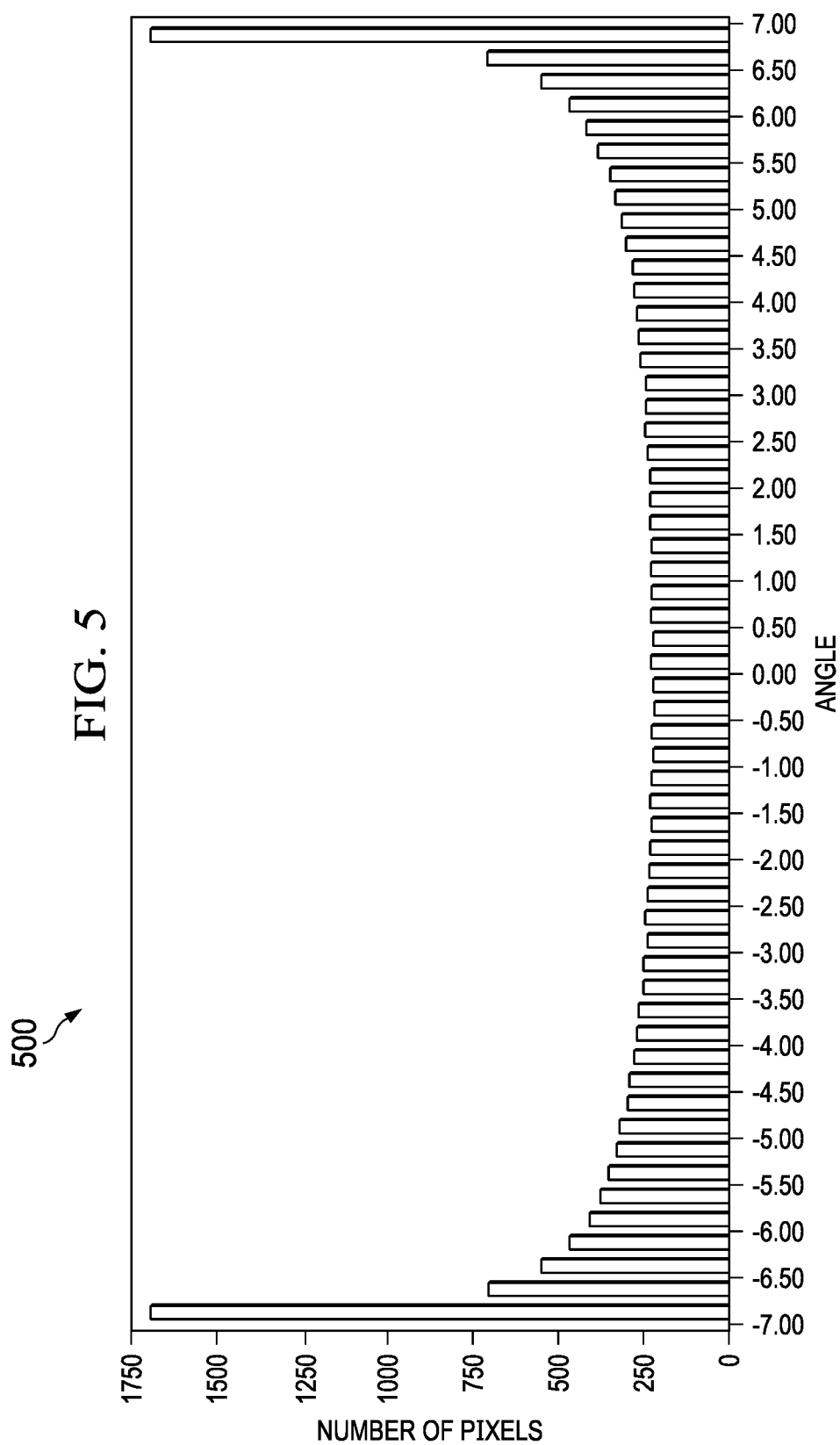

MEMS MIRROR IN SERIES WITH RESONANT MEMS MIRROR TO REDISTRIBUTE DENSE PIXELS

BACKGROUND

Some display systems employ a projector, which is an optical device that projects or shines a pattern of light onto another object (e.g., onto a surface of another object, such as onto a projection screen or retina) to display an image or video on or via that other object. In projectors employing lasers as light sources (i.e., a "laser projector"), each beam of laser light generated by the laser projector is temporally modulated to provide a pattern of laser light and controllable mirrors, such as micro-electromechanical system (MEMS) mirrors rotatable about a single axis (1-D) or about two axes (2-D), are typically used to focus the modulated pattern of laser light at a point on another object or to spatially distribute the modulated pattern of laser light over a two-dimensional area of another object.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a histogram illustrating pixel distribution from a MEMS mirror that rotates about an axis in a sinusoidal pattern.

DETAILED DESCRIPTION

Figure 1:
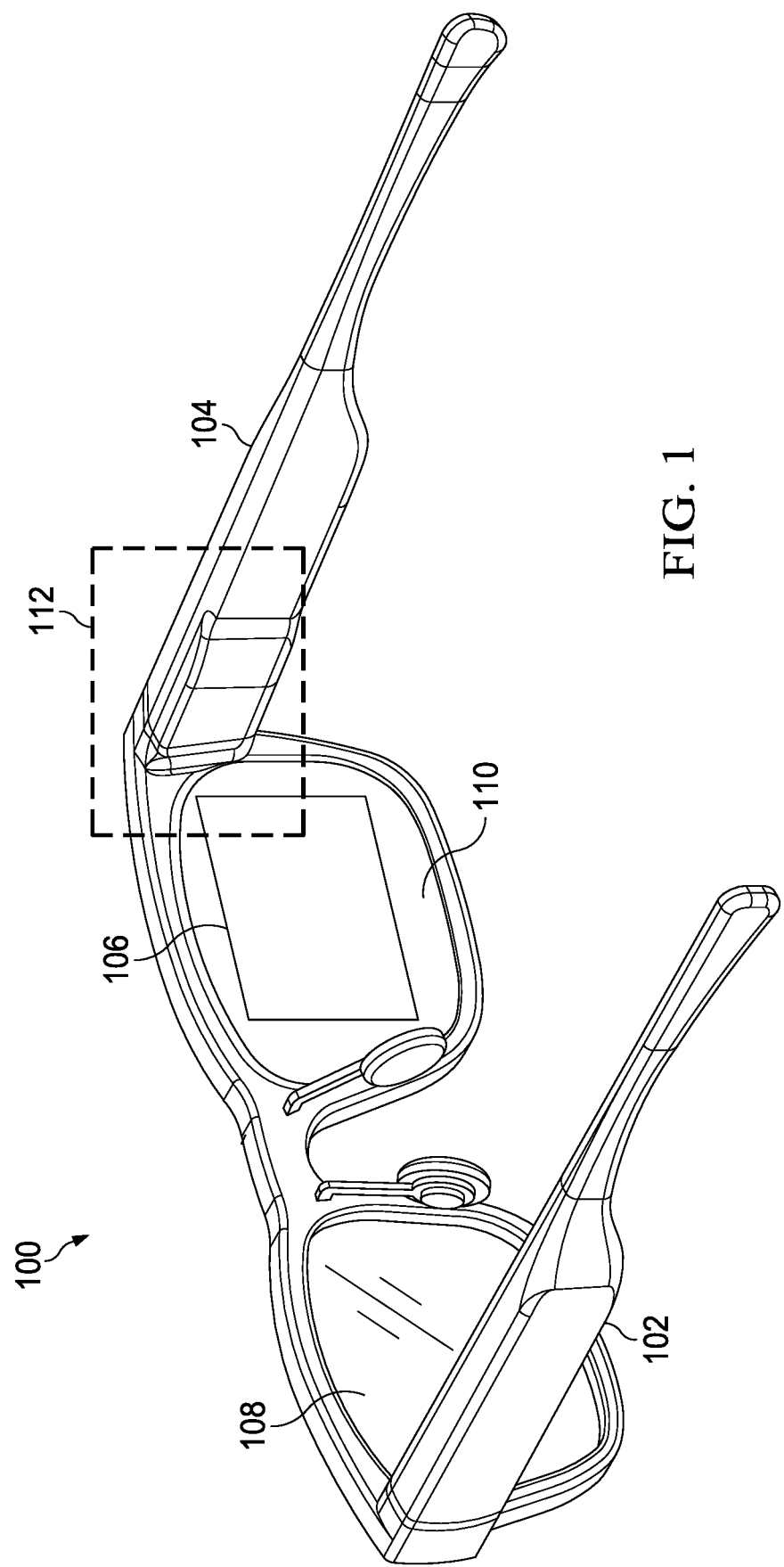
FIG. 1 is a diagram illustrating a display system having an integrated laser projector, in accordance with some embodiments.

Near-eye display systems (such as wearable heads-up displays (WHUDs)) typically include a modulatable light source such as one or more lasers, one or more MEMS mirrors, an optical relay, and a waveguide. Each of the MEMS mirrors receives light output from the light source in series, and each MEMS mirror scans the light over a range of angles to direct the light in a respective direction. The optical relay receives the scanned light from an initial MEMS mirror and introduces a convergence to the light (e.g., via collimation) to focus the light to a point or a line at an exit pupil plane of the optical relay beyond a second MEMS mirror. The second MEMS mirror receives the focused light and scans the light in a direction orthogonal to the direction of light scanned by the initial MEMS mirror to a point or line at an incoupler (IC) of the waveguide. The optical relay enables the MEMS mirrors to be physically separated from the IC to route light onto the MEMS mirrors and into the IC. The incoupler receives the light over a range of input angles, and the light propagates through the waveguide within angles acceptable to achieve total internal reflection (TIR) within the waveguide. The light exits the waveguide at an outcoupler so that the light is projected onto the eye of a user.

In a display system including a scanning MEMS mirror projector with a "resonant" mirror, the mirror angle sweeps in a sinusoidal pattern. If the light source (e.g., laser, light-emitting diode (LED), etc.) is pulsed at a fixed frequency and is directed by a resonant MEMS mirror toward an object such as the IC of a waveguide, the number or density of illumination pulses or pixels at the extents of the sinusoidal scan will be relatively high, compared to the number or density of illumination pulses or pixels at the central portion of the scan. To avoid over-saturation of pixels at the extents of the sinusoidal scan of the resonant MEMS mirror, typically, the illumination source or sources are turned off in the extent regions of the scan pattern such that, in some cases, approximately 10-15% of the scan area is not used for the display. However, turning off the illumination source(s) results in lost power efficiency for the display system, because the non-illumination source portions of the display system (e.g., the display electronics, MEMS controllers, etc.) continue to consume power even if the illumination sources are turned off during the time the resonant MEMS mirror is rotating through the outer portions of the scan area.

FIGS. 1-12 illustrate embodiments of a near-eye display system that employs a low-amplitude, low-frequency MEMS mirror in series with a resonant MEMS mirror to rotate at a reduced amplitude and frequency with respect to the resonant MEMS mirror redistribute illumination pulses or pixels at the extents of a sinusoidal angular scan pattern of the resonant MEMS mirror. The low-amplitude, low-frequency MEMS mirror and the resonant MEMS mirror receive collimated light and direct the light to provide an illumination pattern forming an image at an object such as an incoupler (IC) of a waveguide. In some embodiments, the low-amplitude, low-frequency MEMS mirror accepts collimated light and generates scan angles. A resonant MEMS mirror in the series receives the light scanned by the low-amplitude, low-frequency MEMS mirror and scans at a range of angles at an amplitude and frequency greater than the amplitude and frequency of the low-amplitude, low-frequency MEMS mirror to direct the scanned light to the IC. By including the low-amplitude, low-frequency MEMS mirror and rotating the low-amplitude, low-frequency MEMS mirror at a smaller amplitude and lower frequency than the resonant MEMS mirror, the display system redistributes the illumination pulses reflected from the resonant MEMS mirror.

In some embodiments, the low-amplitude, low-frequency MEMS mirror is also a resonant MEMS mirror having a mirror angle that sweeps in a sinusoidal pattern. The angles at which the illumination pulses or pixels are directed from the series of resonant MEMS mirrors are determined by the sum of the scan angles of each resonant MEMS mirror. In some embodiments, the frequency of the higher-amplitude, higher-frequency MEMS mirror is an integer multiple of the frequency of the low-amplitude, low-frequency MEMS mirror, and in other embodiments, the frequency of the higher-amplitude, higher-frequency MEMS mirror is a non-integer multiple of the frequency of the low-amplitude, low-frequency MEMS mirror and is marginally (e.g., as little as 0.5%) faster than the frequency of the low-amplitude, low-frequency MEMS mirror. The addition of the low-amplitude, low-frequency resonant MEMS mirror in series with the higher-amplitude, higher-frequency resonant MEMS mirror redistributes the illumination pulses or pixels from the extents of the sinusoidal scan pattern of the higher-amplitude, higher-frequency resonant MEMS mirror toward the center region of the sinusoidal scan pattern, resulting in a more even distribution of the illumination pulses or pixels and a higher density of illumination pulses or pixels at the center region.

In other embodiments, the low-amplitude, low-frequency MEMS mirror is a linear MEMS mirror having a mirror angle that sweeps in a linear pattern. The addition of the linear low-amplitude, low-frequency MEMS mirror in series with the resonant MEMS mirror redistributes the illumination pulses or pixels by shifting the sinusoidal scan pattern linearly, either up and down or right and left. By shifting the sinusoidal scan pattern, the linear low-amplitude, low-frequency MEMS mirror extends the area of the scan pattern. The extended area of the scan pattern expands the field of view (FOV) of the displayed image if the amplitude of the resonant MEMS mirror is unchanged, leading to an enhanced user experience. Alternatively, the extended area of the scan pattern due to the addition of the linear low-amplitude, low-frequency MEMS mirror in series with the resonant MEMS mirror allows for the amplitude of the resonant MEMS mirror to be reduced while maintaining the original FOV of the displayed image. Reducing the amplitude of the resonant MEMS conserves power, as less power is required to rotate the resonant MEMS at a smaller amplitude.

FIG. 1 illustrates an example display system 100 employing a scanning-based optical system in accordance with some embodiments. The display system 100 has a support structure 102 that includes an arm 104, which houses a projector (e.g., a laser projector, a micro-LED projector, a Liquid Crystal on Silicon (LCOS) projector, or the like). The projector is configured to project images toward the eye of a user via a waveguide, such that the user perceives the projected images as being displayed in a field of view (FOV) area 106 of a display at one or both of lens elements 108, 110. In the depicted embodiment, the display system 100 is a near-eye display system in the form of a WHUD in which the support structure 102 is configured to be worn on the head of a user and has a general shape and appearance (that is, form factor) of an eyeglasses (e.g., sunglasses) frame.

The support structure 102 contains or otherwise includes various components to facilitate the projection of such images toward the eye of the user, such as a projector and a waveguide. In some embodiments, the support structure 102 further includes various sensors, such as one or more front-facing cameras, rear-facing cameras, other light sensors, motion sensors, accelerometers, and the like. In some embodiments, the support structure 102 includes one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1. It should be understood that instances of the term "or" herein refer to the non-exclusive definition of "or", unless noted otherwise. For example, herein the phrase "X or Y" means "either X, or Y, or both".

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, a projection system of the display system 100 uses light to form a perceptible image or series of images by projecting the light onto the eye of the user via a projector of the projection system, a waveguide formed at least partially in the corresponding lens element 108 or 110, and one or more optical elements (e.g., one or more scan mirrors, one or more optical relays, or one or more collimation lenses that are disposed between the projector and the waveguide or integrated with the waveguide), according to various embodiments.

One or both of the lens elements 108, 110 includes at least a portion of a waveguide that routes display light received by an incoupler of the waveguide to an outcoupler of the waveguide, which outputs the display light toward an eye of a user of the display system 100. The display light is modulated and projected onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector of the projection system of the display 100 is a digital light processing-based projector, a scanning laser projector, or any combination of a modulative light source, such as a laser or one or more light-emitting diodes (LEDs), and a dynamic reflector mechanism such as one or more dynamic scanners, reflective panels, or digital light processors (DLPs). In some embodiments, the projector includes a micro-display panel, such as a micro-LED display panel (e.g., a micro-AMOLED display panel, or a micro inorganic LED (i-LED) display panel) or a micro-Liquid Crystal Display (LCD) display panel (e.g., a Low Temperature PolySilicon (LTPS) LCD display panel, a High Temperature PolySilicon (HTPS) LCD display panel, or an In-Plane Switching (IPS) LCD display panel). In some embodiments, the projector includes a Liquid Crystal on Silicon (LCOS) display panel. In some embodiments, a display panel of the projector is configured to output light (representing an image or portion of an image for display) into the waveguide of the display system. The waveguide expands the light and outputs the light toward the eye of the user via an outcoupler.

The projector is communicatively coupled to the controller and a non-transitory processor-readable storage medium or memory storing processor-executable instructions and other data that, when executed by the controller, cause the controller to control the operation of the projector. In some embodiments, the controller controls the projector to selectively set the location and size of the FOV area 106. In some embodiments, the controller is communicatively coupled to one or more processors (not shown) that generate content to be displayed at the display system 100. The projector outputs light toward the FOV area 106 of the display system 100 via the waveguide. In some embodiments, at least a portion of an outcoupler of the waveguide overlaps the FOV area 106. Herein, the range of different user eye positions that will be able to see the display is referred to as the eyebox of the display.

Figure 2:
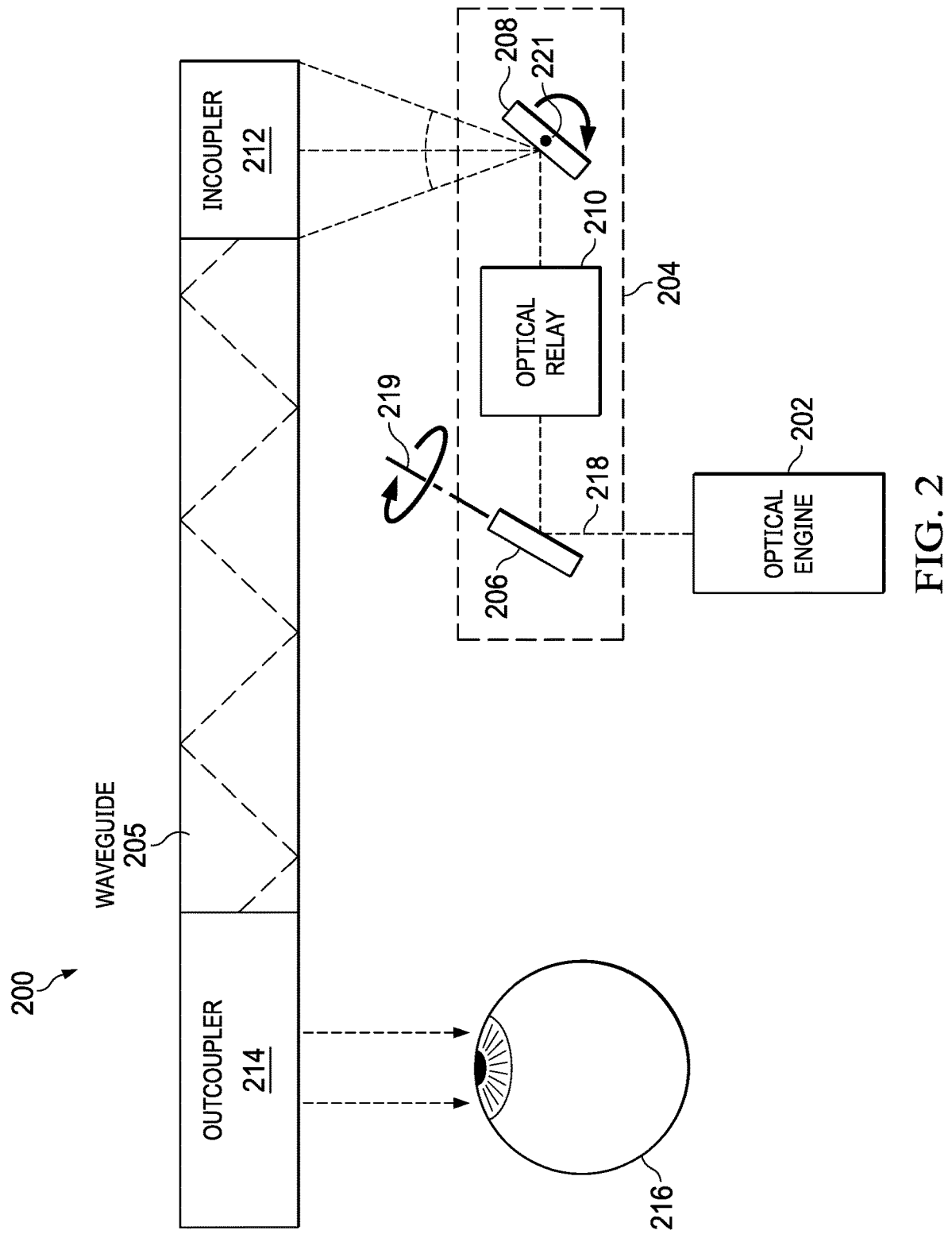
FIG. 2 is a diagram illustrating a laser projector having an optical scanner that includes an optical relay disposed between a low-amplitude, low-frequency MEMS mirror and a higher-amplitude, higher-frequency resonant MEMS mirror, in accordance with some embodiments.

FIG. 2 illustrates a simplified block diagram of a laser projector 200 that projects images directly onto the eye of a user via laser light. The laser projector 200 includes an optical engine 202, an optical scanner 204, and a waveguide 205. The optical scanner 204 includes a low-amplitude, low-frequency MEMS mirror 206, a higher-amplitude, higher-frequency MEMS mirror 208, and an optical relay 210. The waveguide 205 includes an incoupler 212 and an outcoupler 214, with the outcoupler 214 being optically aligned with an eye 216 of a user in the present example. In some embodiments, the laser projector 200 is implemented in a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projector 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

The first scan mirror 206 and the second scan mirror 208 are MEMS mirrors that are driven by respective actuation voltages to oscillate during active operation of the laser projector 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 is a low-amplitude, low-frequency resonant MEMS mirror and the second scan mirror 208 is a higher-amplitude, higher-frequency resonant MEMS mirror. In other embodiments, the first scan mirror 206 is the higher-amplitude, higher-frequency resonant MEMS mirror and the second scan mirror 208 is the low-amplitude, low-frequency resonant MEMS mirror. By adjusting the scan frequencies and amplitudes of the first scan mirror 206 and the second scan mirror 208 to make them different from each other, the density of illumination pulses or pixels generated by the sinusoidal scan pattern of the higher-amplitude, higher-frequency resonant MEMS mirror at the extents of the angular scan range is diffused toward the center region of the scan range, resulting in a more even distribution of illumination pulses or pixels across the FOV and an enhanced user experience. In some embodiments, the differences between the scan frequencies and amplitudes of the first scan mirror 206 and the second scan mirror 208 is relatively small, on the order of 5-10%. In other embodiments, the differences between the scan frequencies and amplitudes of the first scan mirror 206 and the second scan mirror 208 is relatively large, such that the frequency and/or amplitude of the higher-amplitude, higher-frequency resonant MEMS mirror is orders of magnitude higher than the frequency and/or amplitude of the low-amplitude, low-frequency resonant MEMS mirror.

In some embodiments, the low-amplitude, low-frequency MEMS mirror is a linear MEMS mirror rather than a resonant MEMS mirror and the higher-amplitude, higher-frequency MEMS mirror is a resonant MEMS mirror. By adjusting the scan frequencies and amplitudes of the low-amplitude, low-frequency linear MEMS mirror and the higher-amplitude, higher-frequency resonant MEMS mirror to make them different from each other, the illumination pulses or pixels generated by the sinusoidal scan pattern of the higher-amplitude, higher-frequency resonant MEMS mirror is shifted up and down (or left and right, depending on the orientation of the axis about which the low-amplitude, low-frequency linear MEMS mirror rotates) as the low-amplitude, low-frequency linear MEMS mirror toggles between its two positions.

The amount of difference between the amplitudes and/or frequencies of the first scan mirror 206 and the second scan mirror 208 is determined in some embodiments based on one or more factors, such as a desired illumination pulse or pixel distribution, the relative sizes of the first scan mirror 206 and the second scan mirror 208, the distance between the first scan mirror 206 and the second scan mirror 208, the presence of an optical relay between the first scan mirror 206 and the second scan mirror 208, and a power budget for actuating the first scan mirror 206 and the second scan mirror 208. For example, rotating a large scan mirror at a high amplitude requires more power than rotating a smaller scan mirror at a lower amplitude. Therefore, if the larger of the first scan mirror 206 and the second scan mirror 208 is the low-amplitude, low-frequency resonant MEMS mirror, less power will be used than if the larger of the first scan mirror 206 and the second scan mirror 208 is the higher-amplitude, higher-frequency resonant MEMS mirror.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208.

Herein, a "pupil plane" refers to a location along the optical path of laser light through an optical system where the laser light converges to an aperture along one or more dimensions. For example, the optical relay 210 may be associated with one or more entrance pupil planes located along the optical path of laser light through the optical system where the laser light converges to a virtual aperture before entering the optical relay 210. For example, the optical relay 210 may be associated with one or more exit pupil planes located along the optical path of laser light through the optical system where the laser light converges to a virtual aperture along one or more dimensions after exiting the optical relay 210. In some embodiments, an entrance pupil plane of the optical relay 210 may be located coincident with the first scan mirror 206. In some embodiments, an entrance pupil plane of the optical relay 210 may be located at an intermediate location between the first scan mirror 206 and the optical relay 210. In some embodiments, an exit pupil plane of the optical relay 210 may be located coincident with the second scan mirror 208. In some embodiments, an exit pupil plane of the optical relay 210 may be located coincident with the incoupler 212.

In some instances, the laser light converges to a virtual aperture of a first entrance pupil plane along a first dimension (e.g., with the laser light converging along the x-y dimension to a point or line along a z dimension with respect to a cartesian coordinate system having x-, y-, and z-axes) and converges to a virtual aperture of a second entrance pupil plane along a second dimension (e.g., the second dimension being substantially perpendicular to the first dimension), where the first and second entrance pupil planes differ with respect to location. In some instances, the laser light converges to a virtual aperture of a first exit pupil plane along a first dimension (e.g., with the laser light converging along the x-y dimension to a point or line along a z dimension with respect to a cartesian coordinate system having x-, y-, and z-axes) and converges to a virtual aperture of an exit entrance pupil plane along a second dimension (e.g., the second dimension being substantially perpendicular to the first dimension), where the first and second exit pupil planes differ with respect to location. In other instances, the laser light converges to a virtual aperture of a single entrance pupil plane along all dimensions (e.g., with the laser light converging to the virtual aperture along each of the x, y, and z dimensions) and converges to a virtual aperture of a single exit pupil plane along all dimensions.

While, in the present example, the optical engine 202 is shown to output a single beam of laser light 218 (which itself may be a combination of two or more beams of light having respectively different polarizations or wavelengths) toward the first scan mirror, in some embodiments, the optical engine 202 is configured to generate and output two or more laser light beams toward the first scan mirror, where the two or more laser light beams are angularly separated with respect to one another (i.e., they are "angularly separated laser light beams"). As described previously, two or more laser light beams are "angularly separated" when propagate along respectively different non-parallel and non-perpendicular optical paths that are tilted (e.g., angularly offset) with respect to one another, with the angular separation of the optical paths, in some instances, causing the two or more laser light beams to converge to overlap one another along one or more dimensions (e.g., such overlap corresponding to a virtual aperture of a pupil plane).

In the present example, the possible optical paths of the laser light 218, following reflection by the first scan mirror 206, are initially spread along a first scanning dimension, but later these paths intersect at an exit pupil plane beyond the second scan mirror 208 due to convergence introduced by the optical relay 210. For example, the width (i.e., smallest dimension) of a given exit pupil plane approximately corresponds to the diameter of the laser light corresponding to that exit pupil plane. Accordingly, the exit pupil plane can be considered a "virtual aperture". In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil plane of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to reshape (e.g., circularize) the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projector 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms.

In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projector 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
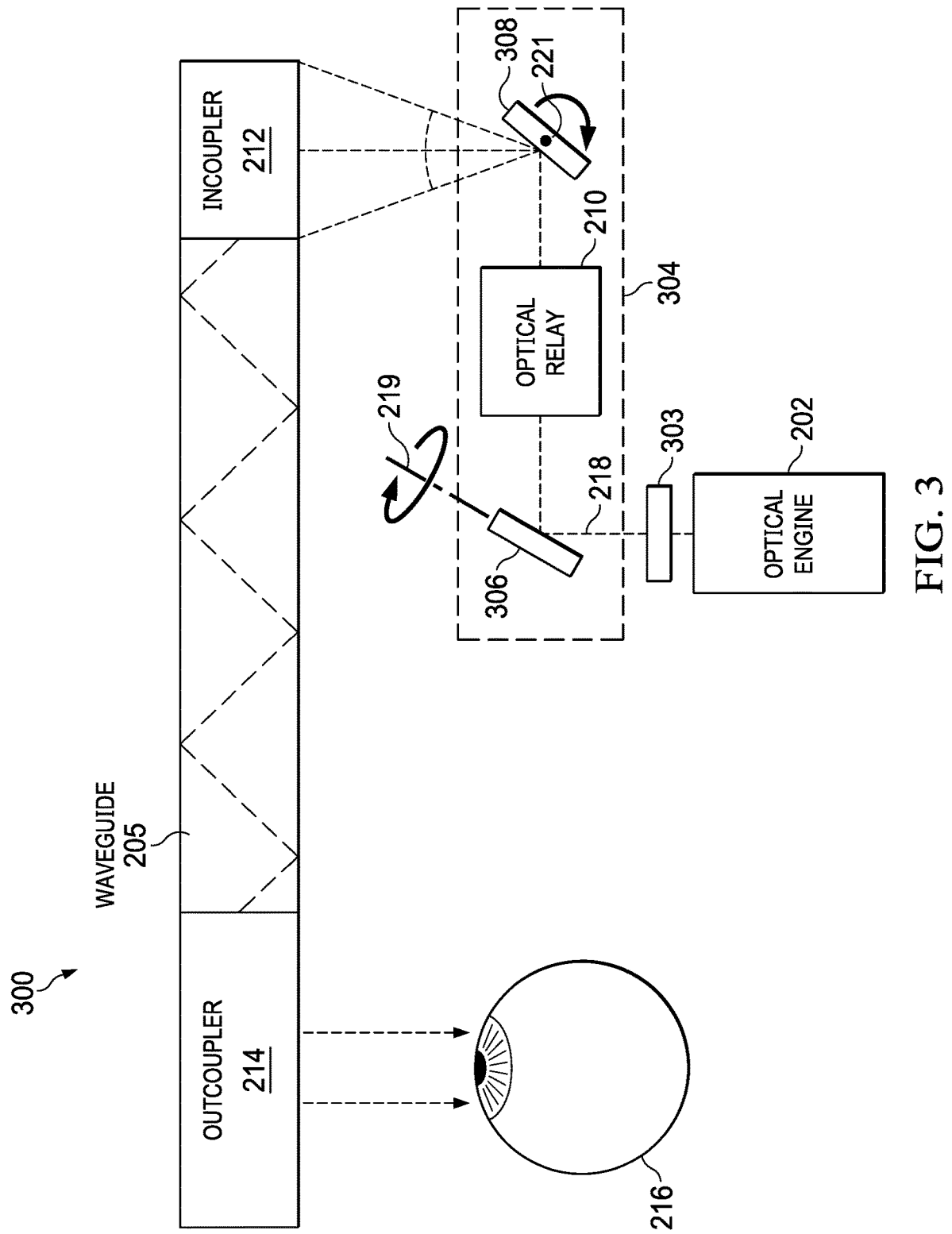
FIG. 3 is a diagram illustrating a laser projector having an optical scanner that includes a low-amplitude, low-frequency MEMS mirror and an optical relay disposed between two higher-amplitude, higher-frequency resonant MEMS mirrors, in accordance with some embodiments.

FIG. 3 illustrates a simplified block diagram of a laser projector 300 that projects images directly onto the eye of a user via laser light. The laser projector 300 includes an optical engine 202, a low-amplitude, low-frequency MEMS mirror 303, an optical scanner 304, and a waveguide 205. The optical scanner 304 includes an optical relay 210 disposed between two higher-amplitude, higher-frequency resonant MEMS mirrors 306, 308. The waveguide 205 includes an incoupler 212 and an outcoupler 214, with the outcoupler 214 being optically aligned with an eye 216 of a user in the present example. The optical engine 202, waveguide 205, and optical relay 210 operates similarly to the optical engine 202, waveguide 205, and optical relay 210 described with reference to FIG. 2. In some embodiments, the laser projector 200 is implemented in a wearable heads-up display or another display system, such as the display system 100 of FIG. 1.

Both of the first and second scan mirrors 306 and 308 of the optical scanner 304 are resonant MEMS mirrors in some embodiments. For example, the first scan mirror 206 and the second scan mirror 208 are resonant MEMS mirrors that are driven by respective sinusoidally varying actuation voltages to oscillate during active operation of the laser projector 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205. In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221. In the illustrated embodiment, the first and second scan mirrors 306 and 308 oscillate at the same frequency. In some embodiments, the first and second scan mirrors 306 and 308 oscillate at the same amplitude and in other embodiments their respective amplitudes of oscillation are different from each other.

In the illustrated embodiment, the laser light 218 output by the optical engine 202 is reflected by the low-amplitude, low-frequency MEMS mirror 203. In some embodiments, a controller (not shown) is configured to modify respective orientations of the low-amplitude, low-frequency MEMS mirror 203 to change the angle at which the laser light 218 is incident on the first scan mirror 206, thereby redistributing illumination pulses or pixels projected by the laser projector 200. In some embodiments, the low-amplitude, low-frequency MEMS mirror 203 is a resonant MEMS mirror that sweeps a range of scan angles based on a sinusoidally fluctuating drive signal and redistributes illumination pulses or pixels from the extents of the scan pattern generated by the optical scanner 204 to a central portion of the scan pattern. In other embodiments, the low-amplitude, low-frequency MEMS mirror 203 is a linear MEMS mirror that sweeps a range of scan angles based on a linearly fluctuating drive signal and shifts the scan pattern generated by the optical scanner 204 alternately up and down or side to side, depending on the orientation of the axis about which the low-amplitude, low-frequency MEMS mirror 203 rotates with respect to the first axis 219 and the second axis 221. By redistributing the illumination pulses or pixels of the scan pattern generated by the optical scanner 204 in this way, the lasers can remain energized for the entire range of angles scanned by the scan mirrors 206 and 208. Energizing the lasers for the entire range of angles scanned by the scan mirrors 206 and 208 results in a brighter display than if the lasers were not energized for the entire range of angles scanned by the scan mirrors 206 and 208.

Figure 4:
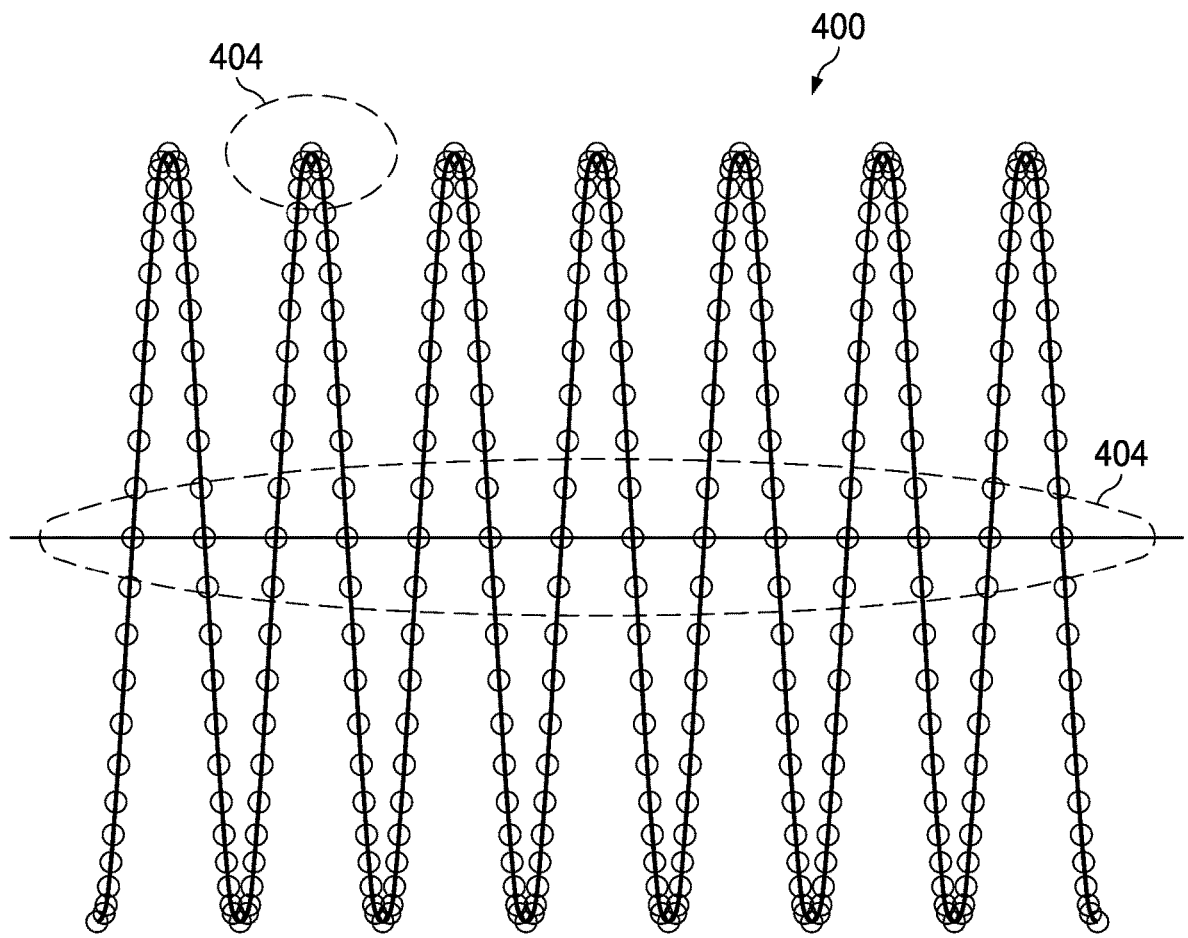
FIG. 4 is a diagram illustrating pixel distribution from a MEMS mirror that rotates about an axis in a sinusoidal pattern.

FIG. 4 is a diagram 400 illustrating pixel distribution from a resonant MEMS mirror (not shown) that rotates about an axis to sweep through scan angles in a sinusoidal pattern. Typically, a MEMS mirror rotates about one or more axes due to an actuator that applies a force to the MEMS mirror which tilts the MEMS mirror about at least one rotational axis when the actuator is provided with a drive signal. The magnitude of force applied by the actuator depends on the amplitude of the drive signal. For example, if the drive signal provided to the actuator of the MEMS mirror has a varying amplitude (e.g., if the drive signal is a sinusoidal drive signal), then the force applied by the actuator to the MEMS mirror will vary sinusoidally such that the MEMS mirror oscillates about its rotational axis. The maximum amplitude of the oscillation of the MEMS mirror will be an angular position Θ corresponding to the maximum amplitude of the drive signal.

The scan pattern resulting from a light source pulsed at a fixed frequency that is reflected by the resonant MEMS mirror has relatively more illumination pulses or pixels at the extents of the scan pattern, such as shown in area 402, and relatively fewer illumination pulses or pixels at the central portion of the scan pattern, such as shown in area 404. The high density of illumination pulses or pixels at the extents of the scan pattern render the extents of the scan pattern unusable for many display applications, such that the illumination sources are typically turned off (i.e., not energized) during the portion of the scan at the extents of the scan pattern and approximately 10-15% of the scan is not used.

FIG. 5 is a histogram 500 illustrating pixel distribution from a MEMS mirror that rotates about an axis driven by a drive signal having an amplitude that varies in a sinusoidal pattern. In the illustrated example, the MEMS mirror has an angular range shown along the x-axis of −7.00 degrees to +7.00 degrees. The y-axis plots the number of illumination pulses or pixels at each point along the angular scan range of the MEMS mirror. The number of illumination pulses at the farthest reaches of the angular scan range is orders of magnitude greater than the number of illumination pulses at the center of the angular scan range. For example, there are approximately 900 illumination pulses at the extreme ends of the distribution while at the central region there are only approximately 120 occurrences in the same time period.

Figure 6:
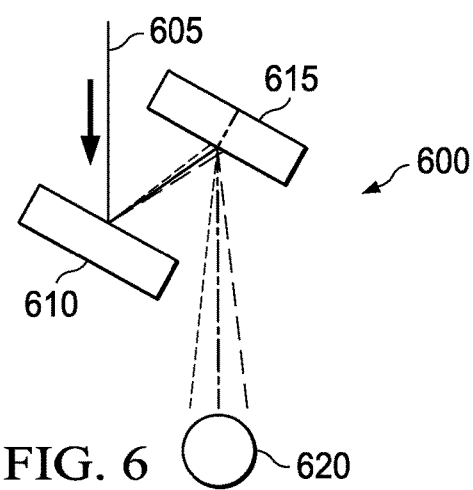
FIG. 6 is a diagram illustrating a relatively lower-amplitude, lower-frequency MEMS mirror in series with a MEMS mirror that rotates about an axis in a sinusoidal pattern to redistribute pixels of an image, in accordance with some embodiments.

FIG. 6 is a diagram 600 illustrating a relatively low-amplitude, low-frequency MEMS mirror 610 in series with a higher-amplitude, higher-frequency resonant MEMS mirror 615 to redistribute illumination pulses or pixels of an image to an IC 620 of a waveguide (not shown) in accordance with some embodiments. The lower-amplitude, lower-frequency MEMS mirror 610 receives collimated light 605 (referred to herein as light 605) generated by a light engine such as optical engine 202 including one or more laser diodes (not shown). The low-amplitude, low-frequency MEMS mirror 610 rotates about an axis to scan the light 605 reflected off the lower-amplitude, lower-frequency MEMS mirror 610 across a first range of angles to the higher-amplitude, higher-frequency resonant MEMS mirror 615.

The higher-amplitude, higher-frequency resonant MEMS mirror 615 receives the light 605 reflected off the low-amplitude, low-frequency MEMS mirror 610 and rotates to scan the light 605 reflected off the higher-amplitude, higher-frequency resonant MEMS mirror 615 across a second range of angles to a point or line at the IC 620. The first range of angles through which the low-amplitude, low-frequency MEMS mirror 610 rotates redistributes the illumination pulses or pixels generated by the scan pattern of the higher-amplitude, higher-frequency resonant MEMS mirror 615.

Because light 605 received at the low-amplitude, low-frequency MEMS mirror 610 is reflected at the angle of incidence, the higher-amplitude, higher-frequency resonant MEMS mirror 615 is larger than the low-amplitude, low-frequency MEMS mirror 610 in some embodiments so that it is sized to receive the light 605 reflected off the low-amplitude, low-frequency MEMS mirror 610. For example, if the low-amplitude, low-frequency MEMS mirror 610 moves across 2 degrees, the reflected rays from the low-amplitude, low-frequency MEMS mirror 610 will spread across 4 degrees. Thus, in some embodiments the higher-amplitude, higher-frequency resonant MEMS mirror 615 is larger than the low-amplitude, low-frequency MEMS mirror 610 to accommodate the fanning out of the rays of incident light 605. In some embodiments, an optical relay such as optical relay 210 is disposed in the optical path between the low-amplitude, low-frequency MEMS mirror 610 and the higher-amplitude, higher-frequency resonant MEMS mirror 615 to converge the light rays reflected off the low-amplitude, low-frequency MEMS mirror 610 before they are incident on the higher-amplitude, higher-frequency resonant MEMS mirror 615. The presence of the optical relay 210 allows for the higher-amplitude, higher-frequency resonant MEMS mirror 615 to have a smaller form factor while still receiving the light 605 reflected off the low-amplitude, low-frequency MEMS mirror 610.

In some embodiments, both the low-amplitude, low-frequency MEMS mirror 610 and the higher-amplitude, higher-frequency resonant MEMS mirror 615 are resonant MEMS mirrors that oscillate such that the rate of change of the angle of the mirrors has a sinusoidal shape. In other embodiments, the low-amplitude, low-frequency MEMS mirror 610 is a linear MEMS mirrors that has a linear rate of angular change. The low-amplitude, low-frequency MEMS mirror 610 and the higher-amplitude, higher-frequency resonant MEMS mirror 615 each rotate about one axis in some embodiments and in other embodiments one or both of the low-amplitude, low-frequency MEMS mirror 610 and the higher-amplitude, higher-frequency resonant MEMS mirror 615 rotate about two axes and produce a Lissajous scan pattern.

Figure 7:
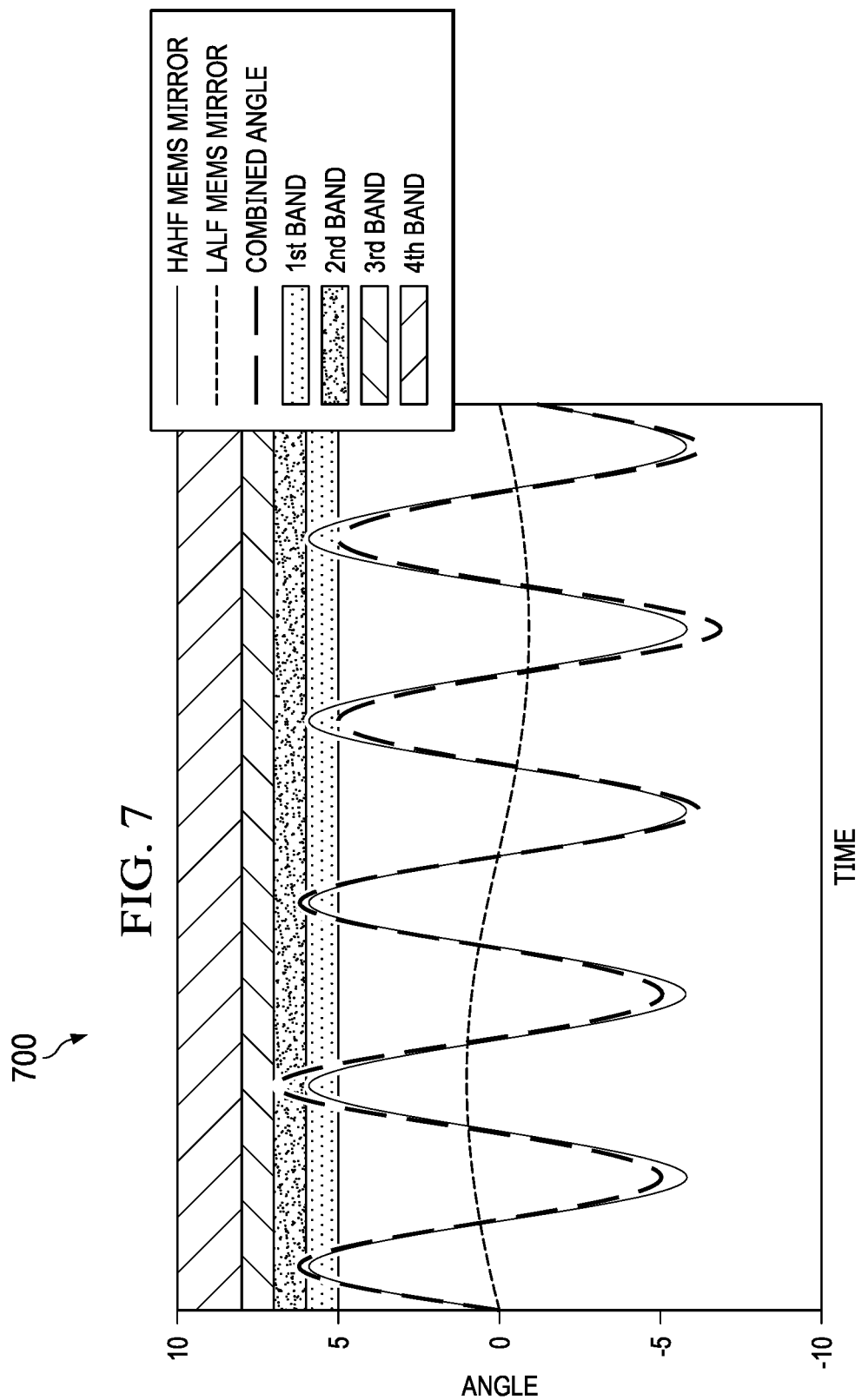
FIG. 7 is a graph illustrating relative frequencies and amplitudes of first and second MEMS mirrors in series to redistribute pixels of an image, in accordance with some embodiments.

FIG. 7 is a graph 700 illustrating relative frequencies and amplitudes of a low-amplitude, low-frequency MEMS mirror and higher-amplitude, higher-frequency resonant MEMS mirror in series to redistribute pixels of an image, in accordance with some embodiments. In the illustrated example, the amplitude of the maximum input angle of the low-amplitude, low-frequency MEMS mirror is approximately 20% of the amplitude of the maximum nominal input angle of the higher-amplitude, higher-frequency resonant MEMS mirror and the frequency of the low-amplitude, low-frequency MEMS mirror is approximately 20% of the frequency of the maximum nominal input angle of the higher-amplitude, higher-frequency resonant MEMS mirror. In embodiments in which the low-amplitude, low-frequency MEMS mirror is a resonant mirror, the superposition of a varying input angle leads to a slight variation in the output angle. Although there is still a higher density of illumination pulses or pixels at the extents of the combined sinusoidal scan pattern, the frequency of peak angles (e.g., above +5 degrees and below −5 degrees) of the combined sinusoidal scan pattern is reduced, as they occur only when the higher-amplitude, higher-frequency resonant MEMS mirror and the low-amplitude, low-frequency MEMS mirror are in phase with each other. As illustrated in FIG. 7, a "1st band" consists of peak angles between 5-6 degrees, a "2nd band" consists of peak angles between 6-7 degrees, a "3rd band" consists of angles between 7-8 degrees, and a "4th band" consists of angles between 8-9 degrees. In the illustrated example, whereas the nominal scanning angle of the higher-amplitude, higher-frequency resonant MEMS mirror reaches the 2nd band for every cycle, the combined sinusoidal scan pattern reaches the 2nd band in fewer cycles. Thus, the addition of the low-amplitude, low-frequency resonant MEMS mirror results in the time-averaged number of illumination pulses or pixels in the peak angles (i.e., from 6 to 7 degrees) occurring less frequently than the time-averaged number of illumination pulses or pixels in the central scan region (i.e., from −5 to +5 degrees).

Figure 8:
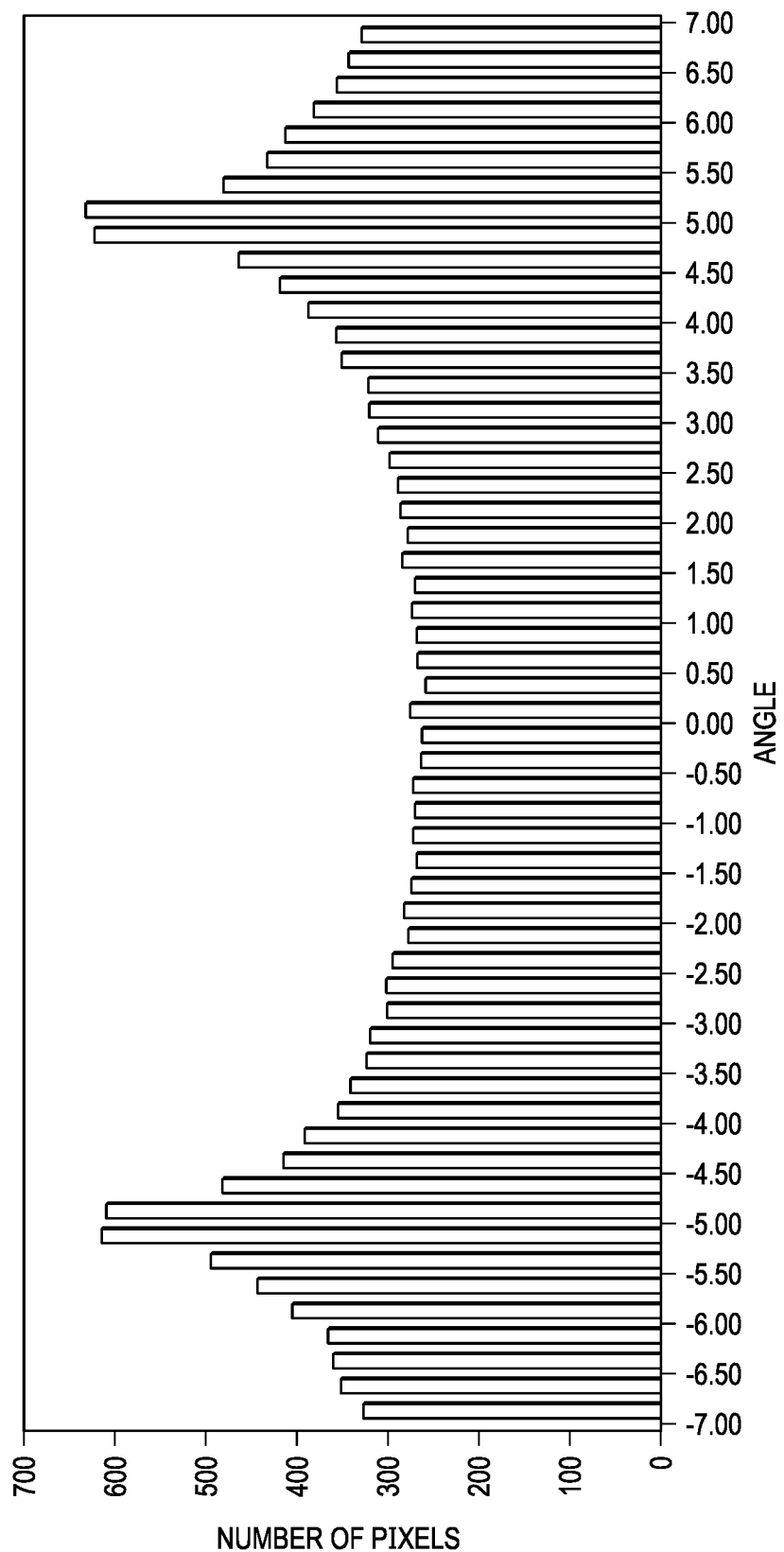
FIG. 8 is a histogram illustrating pixel distribution from a relatively lower-amplitude, lower-frequency MEMS mirror in series with a MEMS mirror that rotates about an axis in a sinusoidal pattern, in accordance with some embodiments.

FIG. 8 is a histogram 800 illustrating pixel distribution from the relatively lower-amplitude, lower-frequency resonant MEMS mirror in series with the higher-amplitude, higher-frequency resonant MEMS mirror of FIG. 7, in accordance with some embodiments. In the illustrated example, the two MEMS mirrors in series have a combined angular range of −7.00 degrees to +7.00 degrees, as shown along the x-axis. The y-axis plots the number of illumination pulses or pixels at each point along the angular scan range of the two MEMS mirrors in series. The number of illumination pulses at the farthest reaches of the angular scan range is significantly reduced compared to the number of illumination pulses at the farthest reaches of the angular scan range of the higher-amplitude, higher-frequency resonant MEMS mirror alone, as illustrated in FIG. 5, while the number of illumination pulses at the center of the angular scan range of the two MEMS mirrors in series is significantly increased compared to the number of illumination pulses at the center of the angular scan range of the higher-amplitude, higher-frequency resonant MEMS mirror alone, as illustrated in FIG. 5.

Figure 9:
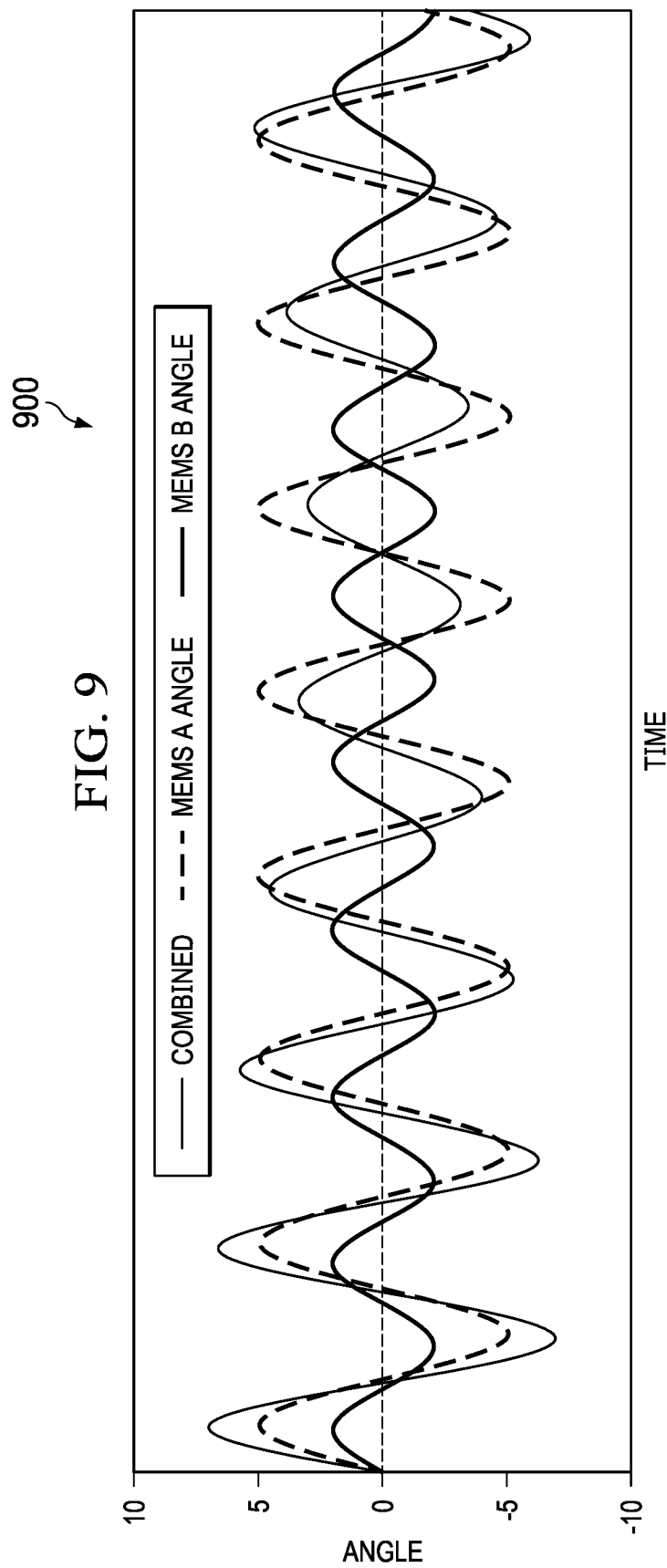
FIG. 9 is a graph illustrating relative frequencies and amplitudes of first and second MEMS mirrors in series to redistribute pixels of an image, in accordance with some embodiments.

FIG. 9 is a graph illustrating relative frequencies and amplitudes of a low-amplitude, low-frequency resonant MEMS mirror and higher-amplitude, higher-frequency resonant MEMS mirror in series to redistribute pixels of an image, in accordance with some embodiments. In the illustrated example, the amplitude of the maximum input angle of the low-amplitude, low-frequency MEMS mirror is approximately 40% of the amplitude of the maximum nominal input angle of the higher-amplitude, higher-frequency resonant MEMS mirror and the frequency of the low-amplitude, low-frequency MEMS mirror is approximately 90% of the frequency of the maximum nominal input angle of the higher-amplitude, higher-frequency resonant MEMS mirror. In embodiments in which the low-amplitude, low-frequency MEMS mirror is a resonant mirror, the superposition of a varying input angle leads to a slight variation in the output angle. The addition of the low-amplitude, low-frequency resonant MEMS mirror results in the time-averaged number of illumination pulses or pixels in the peak angles (i.e., extents of the sinusoidal scan pattern) being comparable to the time-averaged number of illumination pulses or pixels in the central scan region, even with a relatively small difference between frequencies of the low-amplitude, low-frequency MEMS mirror and the higher-amplitude, higher-frequency resonant MEMS mirror.

Figure 10:
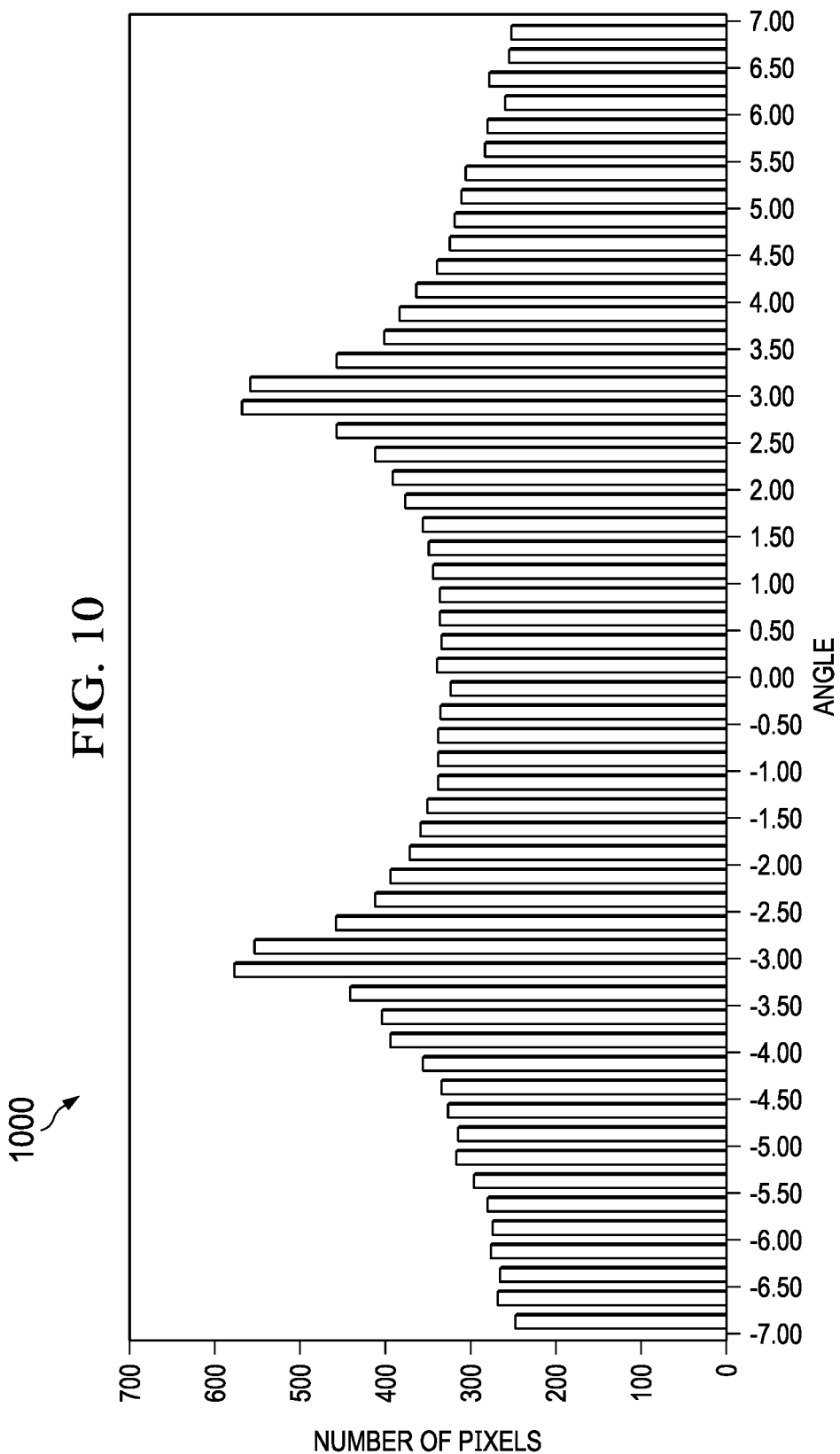
FIG. 10 is a histogram illustrating pixel distribution from a relatively lower-amplitude, lower-frequency MEMS mirror in series with a MEMS mirror that rotates about an axis in a sinusoidal pattern, in accordance with some embodiments.

FIG. 10 is a histogram illustrating pixel distribution from the relatively lower-amplitude, lower-frequency resonant MEMS mirror in series with the higher-amplitude, higher-frequency resonant MEMS mirror of FIG. 9, in accordance with some embodiments. In the illustrated example, the two MEMS mirrors in series have a combined angular range of −7.00 degrees to +7.00 degrees, as shown along the x-axis. The y-axis plots the number of illumination pulses or pixels at each point along the angular scan range of the two MEMS mirrors in series. The number of illumination pulses at the farthest reaches of the angular scan range is significantly reduced compared to the number of illumination pulses at the farthest reaches of the angular scan range of the higher-amplitude, higher-frequency resonant MEMS mirror alone, as illustrated in FIG. 5, while the number of illumination pulses at the center of the angular scan range of the two MEMS mirrors in series is significantly increased compared to the number of illumination pulses at the center of the angular scan range of the higher-amplitude, higher-frequency resonant MEMS mirror alone, as illustrated in FIG. 5.

Figure 11:
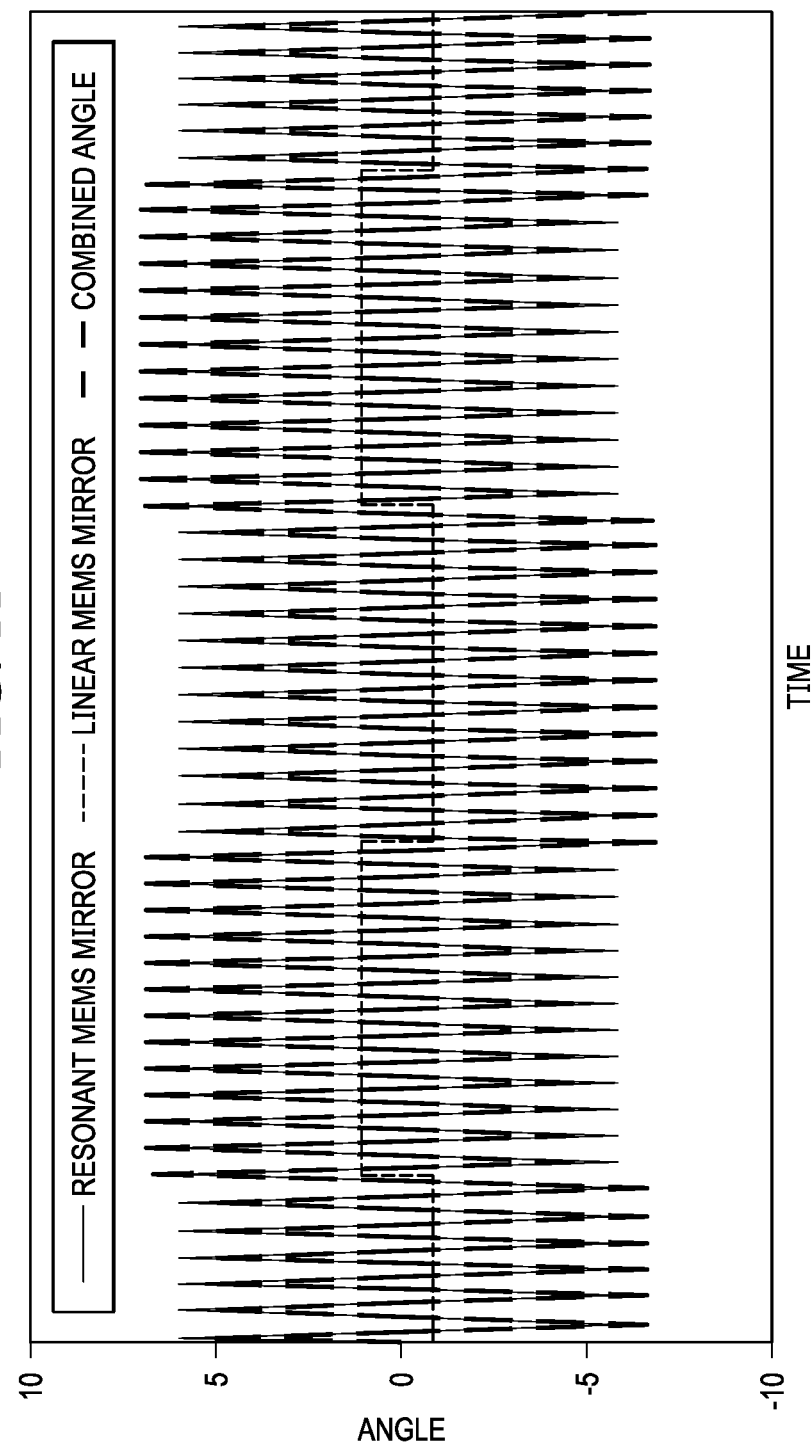
FIG. 11 is a graph illustrating relative frequencies and amplitudes of a low-amplitude, low-frequency linear MEMS mirror and higher-amplitude, higher-frequency resonant MEMS mirror in series to redistribute pixels of an image, in accordance with some embodiments.

FIG. 11 is a graph illustrating relative frequencies and amplitudes of a low-amplitude, low-frequency linear MEMS mirror and higher-amplitude, higher-frequency resonant MEMS mirror in series to redistribute pixels of an image, in accordance with some embodiments. The low-amplitude, low-frequency linear MEMS mirror toggles between two positions of approximately −1 degree and +1 degree in the illustrated example while the higher-amplitude, higher-frequency resonant MEMS mirror oscillates in a sinusoidal scan pattern with a maximum angular scan range of approximately −5 degrees to +5 degrees. The frequency of the higher-amplitude, higher-frequency resonant MEMS mirror is approximately 25 times higher than the frequency of the low-amplitude, low-frequency linear MEMS mirror in the illustrated example. The combined angular scan range of the low-amplitude, low-frequency linear MEMS mirror in series with the higher-amplitude, higher-frequency resonant MEMS mirror shifts between approximately −7 degrees to +5 degrees and −5 degrees to +7 degrees, depending on the phase of the low-amplitude, low-frequency linear MEMS mirror. Thus, when time averaged over many cycles of the low-amplitude, low-frequency linear MEMS mirror, the angular scan range of the low-amplitude, low-frequency linear MEMS mirror in series with the higher-amplitude, higher-frequency resonant MEMS mirror is approximately −7 degrees to +7 degrees, representing an increased scan range over the scan range of the higher-amplitude, higher-frequency resonant MEMS mirror alone. The additional scan range of the combination of the low-amplitude, low-frequency linear MEMS mirror in series with the higher-amplitude, higher-frequency resonant MEMS mirror is used to expand the FOV of the image displayed to a user in some embodiments, or to reduce the angular scan range (and thus power used to drive the actuator) of the higher-amplitude, higher-frequency resonant MEMS mirror while maintaining the FOV that would have been produced by the higher-amplitude, higher-frequency resonant MEMS mirror alone.

Figure 12:
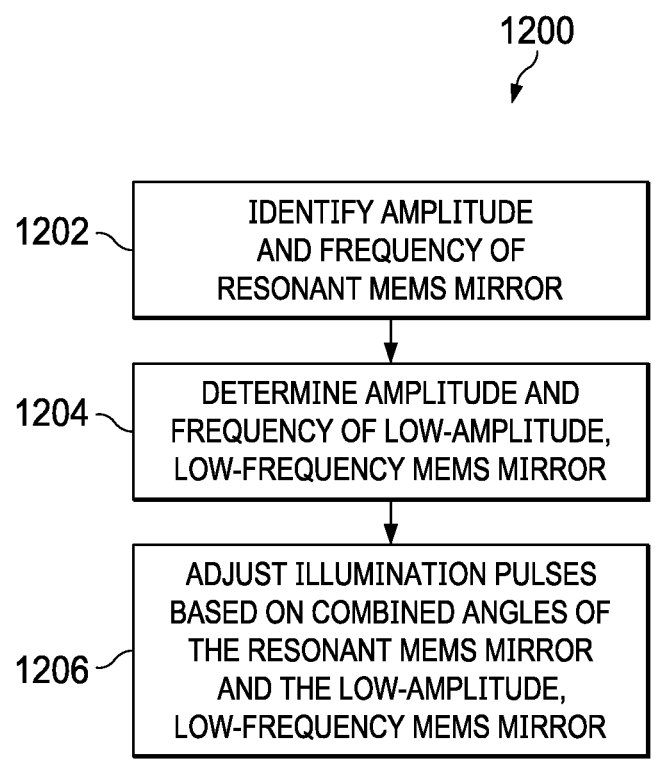
FIG. 12 is a flow diagram of a method of adjusting an amplitude and frequency of a MEMS mirror in series with a resonant MEMS mirror to redistribute pixels of an image at an incoupler of a waveguide, in accordance with some embodiments.

FIG. 12 is a flow diagram of a method 1200 of adjusting an amplitude and frequency of a MEMS mirror in series with a resonant MEMS mirror to redistribute pixels of an image at an incoupler of a waveguide, in accordance with some embodiments. In some embodiments, the method 1200 is performed, at least in part, by executing computer-readable instructions at a controller of a low-amplitude, low-frequency MEMS mirror, such as in an embodiment of the laser projectors 200 and 300 of FIGS. 2 and 3 or the low-amplitude, low-frequency MEMS mirror 610 of FIG. 6.

At block 1202, the controller identifies an amplitude and frequency of the resonant MEMS mirror 615. At block 1204, the controller determines an amplitude and frequency of the low-amplitude, low-frequency MEMS mirror 610. In some embodiments, the amount of difference between the amplitudes and/or frequencies of the low-amplitude, low-frequency MEMS mirror 610 and the higher-amplitude, higher-frequency MEMS mirror 615 is determined based on one or more factors, such as a desired illumination pulse or pixel distribution, the relative sizes of the low-amplitude, low-frequency MEMS mirror 610 and the higher-amplitude, higher-frequency MEMS mirror 615, the distance between the low-amplitude, low-frequency MEMS mirror 610 and the higher-amplitude, higher-frequency MEMS mirror 615, the presence of an optical relay between the low-amplitude, low-frequency MEMS mirror 610 and the higher-amplitude, higher-frequency MEMS mirror 615, and a power budget for actuating the low-amplitude, low-frequency MEMS mirror 610 and the higher-amplitude, higher-frequency MEMS mirror 615.

At block 1206, the optical engine 202 adjusts illumination pulses of the lasers based on the combined scan angles of the low-amplitude, low-frequency MEMS mirror 610 and the higher-amplitude, higher-frequency MEMS mirror 615 to generate a desired image for display.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system comprising:
a waveguide having an incoupler (IC);
a first micro-electromechanical system (MEMS) mirror to receive collimated light and rotate about a first axis at a first amplitude and at a first frequency to generate scanned light having a first range of scan angles; and
a second MEMS mirror in series with the first MEMS mirror to rotate about a second axis in a sinusoidal pattern at a second amplitude and at a second frequency to direct the scanned light to the IC to represent pixels of an image, wherein the second frequency differs by at least 0.5% from the first frequency and wherein the first MEMS mirror redistributes the pixels of the image.

2. The near-eye display of claim 1, wherein the second amplitude is greater than the first amplitude.

3. The near-eye display of claim 1, wherein the second frequency is higher than the first frequency.

4. The near-eye display of claim 1, wherein the first MEMS mirror is a linear MEMS mirror.

5. The near-eye display of claim 1, further comprising:
a light source to generate the collimated light, wherein the light source is to remain energized throughout the rotation by the second MEMS mirror in the sinusoidal pattern.

6. The near-eye display of claim 1, wherein the first amplitude is based on the second amplitude and the presence of an optical relay between the first MEMS mirror and the second MEMS mirror.

7. A display system comprising:
a waveguide having an incoupler (IC); and
a first of micro-electromechanical system (MEMS) mirror configured to receive collimated light and rotate across a first range of angles at a first frequency and at a first amplitude to scan the light along scan angles corresponding to the first range of angles; and
a second MEMS mirror in series with the first MEMS mirror to receive the scanned light and rotate across a second range of angles in a sinusoidal pattern at a second frequency and at a second amplitude, the second frequency different by at least 0.5% from the first frequency and the second amplitude different from the first amplitude, to direct the scanned light to one or more input angles at the IC to generate pixels an image.

8. The display system of claim 7, wherein the first MEMS mirror is a linear MEMS mirror.

9. The display system of claim 7, further comprising:
a light source to generate the collimated light, wherein the light source is to remain energized throughout the rotation by the second MEMS mirror across the second range of angles.

10. The display system of claim 7, wherein the first amplitude is based on the second amplitude and the presence of an optical relay between the first MEMS mirror and the second MEMS mirror.

11. The display system of claim 7, wherein the first MEMS mirror redistributes the pixels of the image.

12. A method, comprising:
receiving collimated light at a first micro-electromechanical system (MEMS) mirror;
rotating the first MEMS mirror about a first axis at a first amplitude and at a first frequency to generate scanned light having a first range of scan angles;
receiving the scanned light at a second MEMS mirror in series with the first MEMS mirror; and
rotating the second MEMS mirror across a second range of angles in a sinusoidal pattern at a second frequency and at a second amplitude, the second frequency differing by at least 0.5% from the first frequency and the second amplitude different from the first amplitude, to direct the scanned light to one or more input angles at an incoupler of a waveguide to generate pixels of an image.

13. The method of claim 12, wherein the first MEMS mirror is a linear MEMS mirror.

14. The method of claim 12, further comprising:
generating the collimated light at a light source, wherein the light source is to remain energized throughout the rotation by the second MEMS mirror across the second range of angles.

15. The method of claim 12, wherein the first amplitude is based on the second amplitude and the presence of an optical relay between the first MEMS mirror and the second MEMS mirror.

16. The method of claim 12, wherein the first MEMS mirror redistributes the pixels of the image.

17. The method of claim 16, wherein the first MEMS mirror shifts the pixels of the image from the extents of a sinusoidal angular scan pattern of the second MEMS to the center of the sinusoidal angular scan pattern.

\* \* \* \* \*